United States Patent Office 3,476,186
Patented Nov. 4, 1969

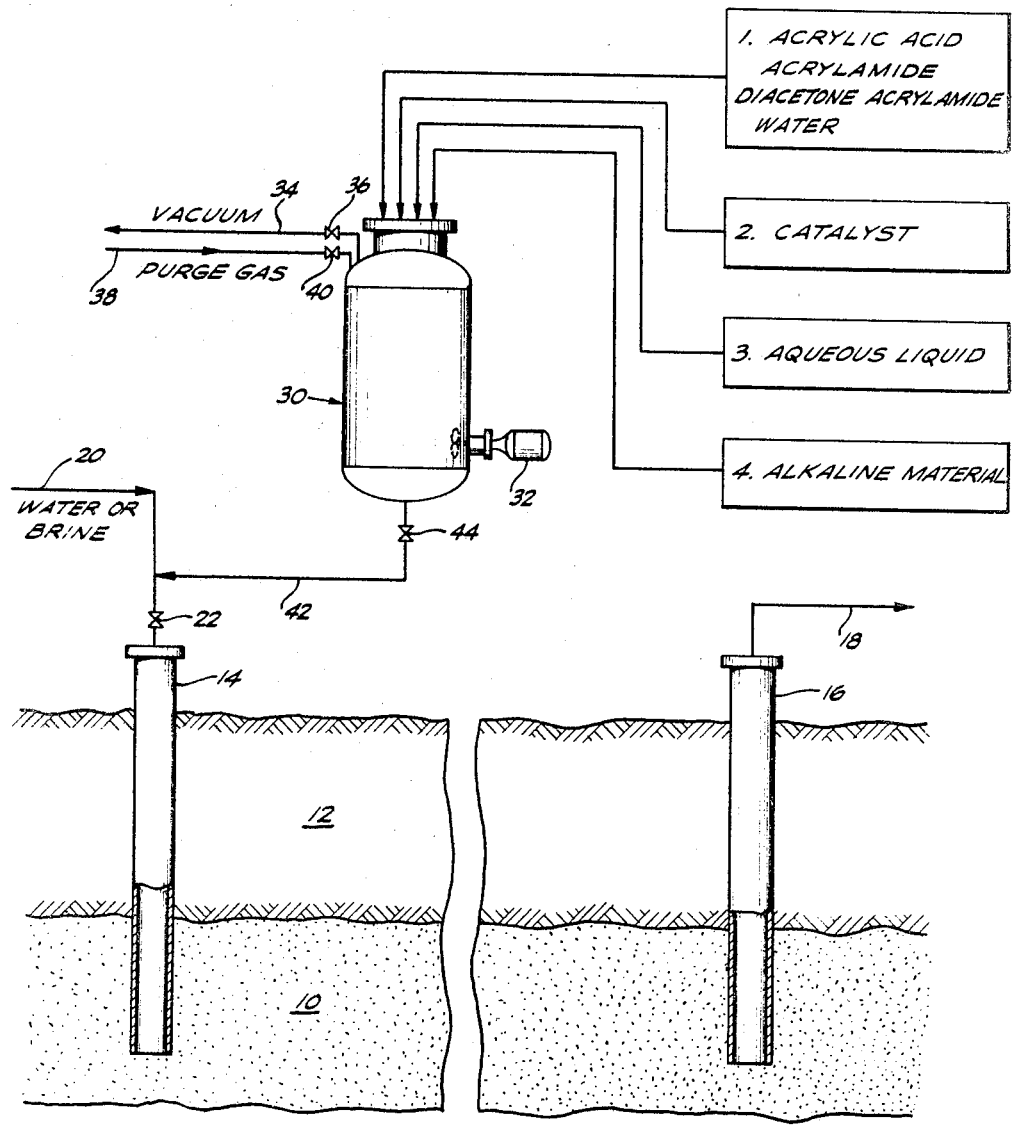

3,476,186
RECOVERY OF PETROLEUM BY FLOODING WITH VISCOUS AQUEOUS SOLUTIONS OF ACRYLIC ACID-ACRYLAMIDE-DIACETONE ACRYLAMIDE COPOLYMER
Amir M. Sarem, Yorba Linda, Calif., assignor to Union Oil Company of California, Los Angeles, Calif., a corporation of California
Filed Dec. 21, 1967, Ser. No. 692,383
Int. Cl. E21b *43/20, 43/22*
U.S. Cl. 166—274
15 Claims

ABSTRACT OF THE DISCLOSURE

A process for recovering petroleum from subterranean oil-bearing formations in which a viscous flooding medium comprising a dilute aqueous solution of a copolymer of acrylic acid, acrylamide and diacetone acrylamide is introduced into the oil-bearing formation through one or more injection wells and forced toward at least one spaced production well. The invention is also directed to a novel water-soluble terpolymer of acrylic acid, acrylamide and diacetone acrylamide useful as a flood water additive and to a method for preparing the polymer in which the monomers are copolymerized in the presence of an organoboron catalyst.

---

This invention relates to the recovery of petroleum from subterranean oil-bearing formations, and more particularly concerns a water flooding process employing as the flooding medium an aqueous solution containing small amounts of a novel water-soluble polymer. In another aspect, the invention concerns novel acrylic acid-acrylamide-diacetone acrylamide copolymers and methods of preparing these copolymers.

In the secondary recovery of petroleum by water flooding, it has been proposed to employ aqueous media rendered more viscous than ordinary water or brine by the incorporation therein of water soluble agents such as water soluble organic polymers. It has been found that polymeric compositions containing amide and carboxyl or carboxylate groups are useful as thickening agents to render aqueous flooding media employed in the recovery of petroleum by water flooding more viscous than ordinary water or brine. These polymers can be prepared by copolymerizing acrylamide and acrylic acid or by the controlled hydrolysis of polyacrylamide. In the first of these methods, a mixture of acrylamide and acrylic acid monomers are reacted in aqueous solution, usually in the presence of a polymerization initiator and an activator. The resulting product is an acrylic acid-acrylamide containing amide and carboxyl groups which can be further neutralized with a suitable alkaline material. While this procedure provides a relatively simple and inexpensive method for producing a polymeric composition containing amide and carboxyl groups, it does not yield the relatively high molecular weight polymers which are particularly desirable as thickening agents for flood water and for certain other uses.

For these reasons, it has been suggested that suitable water-soluble polymers be prepared by polymerizing acrylamide to obtain a polyacrylamide of the desired degree of polymerization and then partially hydrolyzing the resulting polyacrylamide to obtain a polymeric material having the proper proportion of amide and carboxyl groups. In a heretofore preferred mode of preparation, a polymer is produced by polymerizing acrylamide under controlled temperature conditions in an aqueous medium containing sodium carbonate and a polymerization catalyst, such as organic and inorganic peroxides and hydroperoxides, and salts of inorganic per-acids. Although this process is known to produce a polymer characterized by a high degree of water-solubility, by relatively high molecular weight and by uniformity of hydrolysis, it has nevertheless been only marginally successful, partly because of the high cost of producing the polymer, despite relatively low raw material costs, and partly because of the limited improvement in oil recovery obtained by a water flood thickness with this polymer.

Another problem encountered in the use of prior art water-soluble thickening agents is that the complexity of their manufacture generally prohibits their production at the well site. Thus, although these polymers are usually produced in aqueous solution, they are dehydrated and marketed as particulated solids. The solid polymer is then transported to a field location whereupon it is redissolved prior to use. However, the solid polymers are generally difficult to redissolve or redisperse in water, often requiring excessive mixing to obtain homogeneous solutions. Also, the resulting polymer solutions must be strained or filtered to remove undissolved solids that would cause plugging of the formation on injection. This is both wasteful of polymer and time-consuming. Not only is additional processing cost involved in manufacturing the particulated solid polymer and subsequently redissolving it in water to provide the aqueous flooding solution, but often the polymer also suffers some quality degradation during dehydration and storage.

Accordingly, it is a principal object of this invention to provide an improved process for the secondary recovery of petroleum. Another object is to provide an improved thickened aqueous flooding composition useful in the recovery of petroleum. Another object of the invention is to provide an improved agent for thickening an aqueous flooding medium. Yet another object is to provide an improved method of preparing a viscous aqueous flooding medium. A still further object is to provide a process for preparing a thickened aqueous flooding medium that can be practiced at the well site. Other objects and advantages of the invention will be apparent from the following description.

The accompanying drawing is an illustration of a petroleum reservoir shown in cross-section and diagramatically illustrates the process of this invention as practiced in such reservoir.

Briefly, the present invention contemplates a flooding process in which the flooding medium is a dilute aqueous solution of an acrylic acid-acrylamide-diacetone acrylamide terpolymer. Water-soluble polymers useful for thickening aqueous flooding solutions and for other purposes can be prepared by the copolymerization of acrylic acid, acrylamide and diacetone acrylamide in an aqueous system catalyzed by an organoboron compound. The process for preparing the aqueous flooding agent is adapted for practice at the well site, thus avoiding the unnecessary costs associated with the flooding processes employing prior art thickening agents.

More specifically, the invention involves an oil recovery process in which oil is displaced from a subterranean oil-bearing formation by a viscous aqueous solution of an acrylic acid-acrylamide-diacetone acrylamide terpolymer. The viscous solution is injected through one or more injection or input wells penetrating the oil-bearing formation and forced through the formation toward at least one production or output well which is likewise completed in the formation. As the flooding medium passes through the formation it displaces the residual oil therein and carries it into the producing well from where it can be recovered by conventional means. The injection and production wells can be arranged in any convenient pattern, such as the conventional "five-spot" pattern wherein a central producing well is surrounded by four somewhat symmetrically located injection wells. Another of the many conventional flooding patterns that can be employed in the practice of this invention is the "line drive" pattern in which the injection wells are arranged in a line so that the injected flooding medium advances through the formation to displace oil toward one or more spaced production wells that can also be arranged in a line substantially parallel to the line of injection wells. Also, the flooding agents of this invention can be employed in a "slug" type process wherein a quantity of polymer solution, such as from about 0.005 to 0.5 pore volume, is injected into the formation and displaced therethrough by a subsequently injected drive fluid.

The novel polymeric agents found useful in thickening aqueous flood water are subsequently linear, water-soluble polymers having amide, carboxyl and diacetone substituted amide groups arranged along a substantially carbon-carbon chain. The term "acrylic acid-acrylamide-diacetone acrylamide terpolymer," as employed herein, is inclusive of the hydrolyzed polymer wherein the carboxyl groups are in the acid form and also of such polymers wherein the carboxyl groups are in the salt form. Thus, for example, the terpolymer may exist in the hydrolyzed form wherein the carboxyl groups are hydrolyzed to acids, or wherein the carboxylic groups are in the form of salts of ammonium, alkali metal, alkaline earth metal and the like. Although the length of the molecular chain and the proportion and distribution of amide, carboxyl and diacetone substituted amide groups are variable, the terpolymers of this invention are characterized by the generalized formula

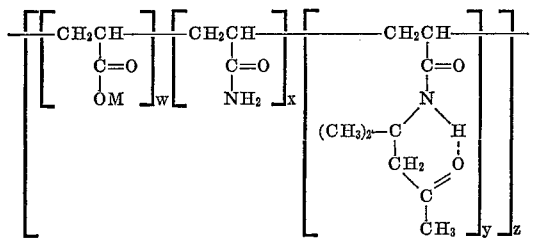

wherein M is a cation and can be hydrogen, ammonium, alkali metal, alkaline earth metal, or other metal that will replace hydrogen to form a carboxylate salt; and wherein $w$, $x$ and $y$ represent respectively the average number of acrylic acid monomer units, acrylamide monomer units and diacetone acrylamide monomer units in the polymer per 100 monomer units of the polymer. The molar proportion of acrylic acid monomer in the polymer is thus represented by the fraction $w/100$, the proportion of acrylamide by the fraction $x/100$, and the proportion of diacetone acrylamide by the fraction $y/100$, and the sum of $w$, $x$ and $y$ equal 100. The subscript $z$ represents the average number of 100 monomer units in the polymer. The diacetone acrylamide group has been shown in the form of a ring structure. However, the bonding or association between the hydrogen and the keto oxygen is relatively weak, and it is to be understood that the diacetone group may be in the form of a linear chain.

The proportions of the various monomer units in the polymer, their distribution along the carbon-carbon chain, and the length of the chain can vary over a wide range, thereby providing a family of polymers having different molecular weights and water solubilities, and differing in other important properties which render certain of these polymers particularly suited for specific applications. Thus, while the composition and structure of the polymers of this invention can vary over wide ranges, it has nevertheless been found that a number of useful acrylic acid-acrylamide diacetone acrylamide copolymers can be defined by the foregoing generalized formula wherein $w$ is from about 10–50, $x$ is from about 25–85 $y$ is from about 1–25, and $z$ varies up to about 8,000.

A material that possesses superior properties as a thickening agent for flood water is an acrylic acid-acrylamide-diacetone acrylamide terpolymer according to the foregoing generalized formula wherein $w$ is from about 15–35, $x$ is from about 45–80, and $y$ is from about 2–15. Further, to prevent a loss in water solubility, the cation ion M is preferably a monovalent cation such as hydrogen, ammonium, or an alkali metal such as sodium, potassium, lithium, rubidium and cesium.

The terpolymers in accordance with the present invention that are particularly useful as flood water additives are characterized by high molecular weight and the ability to increase the viscosity and reluctance to flow of aqueous solutions of the polymer. As a result, it is possible to obtain aqueous solutions having a desirably increased viscosity and reluctance to flow with the use of a minimum amount of polymeric ingredient. The terpolymers found useful as flooding agents are characterized by average molecular weights of at least 500,000 and molecular weights of 1,000,000 or more are preferred, with some of the more preferred polymers having molecular weights up to 40,000,000 or more. The molecular weight of the terpolymer is correlated with the viscosity of a standard solution of the polymer under controlled conditions. Accordingly, it has been found that the terpolymers preferred for use as flood water additives are those characterized by a viscosity of at least 3 centipoises for a 0.05 percent by weight solution thereof in an aqueous 3 percent by weight sodium chloride solution at a temperature of 25° C. as determined by a Brookfield viscosimeter equipped with a UL adapter spindle and operated at a speed of 30 r.p.m.

The polymers of this invention are also characterized by their ability in dilute solution to decrease the mobility of the solution in porous media below that expected from a consideration of the solution viscosity. This characteristic of high reluctance to flow in porous media can be quantified by the resistance factor which is defined as the ratio of the mobility of a brine solution to the mobility of the polymer solution in a permeable body having residual oil saturation. This relationship can be expressed as:

$$R = \frac{\lambda_w}{\lambda_p} = \frac{\left(\frac{k_w}{\mu_w}\right)}{\left(\frac{k_p}{\mu_p}\right)}$$

wherein $R$ = Resistance factor.
$\lambda_w$ = Mobility of brine.
$\lambda_p$ = Mobility of polymer solution.
$k_w$ = Permeability to brine, darcies.
$\mu_w$ = Viscosity of brine, cp.
$\mu_p$ = Viscosity of polymer solution, cp.

The resistance factor can be determined by measuring the flow rate of brine and the polymer solution through a porous member and calculating the resistance factor as the ratio of the measured flow rates at equal pressure drop. Accordingly, it has been found that the terpolymers of this invention preferred for use as water flooding additives are those characterized by resistance factors above about 15 for a 0.05 percent by weight solution of the polymer in a 3 percent by weight solution of sodium chloride at 25° C.

The acrylic acid-acrylamide-diacetone acrylamide terpolymers in accordance with this invention are prepared by copolymerizing acrylic acid, acrylamide and diacetone acrylamide in aqueous solution with an organoboron catalyst. Diacetone acrylamide, also known as (N[2-(2-methyl-4-oxopentyl)]-acrylamide), is a water-soluble substituted acrylamide that can be prepared by the reaction of acrylamide and diacetone alcohol in the following manner:

$CH_2CHCONH_2 + CH_3COCH_2C(CH_3)_2OH \rightarrow$

An aqueous solution of the monomers is prepared and polymerization initiated by the addition of organoboron catalyst. The resulting polymeric product is a viscous liquid or a gel comprising a substantially linear water-soluble copolymer having a minimum of cross-linking and which possesses superior water thickening and other desirable properties, these properties being to some extent controlled by the selection of monomer proportions and the reaction conditions.

The polymerization catalysts useful in the practice of this invention are organoboron compounds, and particularly organoboron compounds having the following generalized formula

wherein $R_1$, $R_2$ and $R_3$ are alkyl radicals, and preferably are alkyl radicals having less than about four carbon atoms in the alkyl group. Thus, the preferred catalysts of this invention comprise a group of trialkylboron compounds having methyl, ethyl, propyl, butyl and iso-butyl substituent groups. These compounds can be mixed alkylborons in that two or more different alkyl groups are contained in the molecule, or the alkyl groups can be the same. Exemplary of this latter class of compounds are trimethylboron, triethylboron, tripropylboron, tri(n-butyl)boron and tri(isobutyl)boron. Further, it is within the scope of this invention to employ a mixture of the foregoing trialkylboron compounds as the catalytic polymerization agent. Also, various boronous anhydrides and boronites exhibit the requisite catalytic properties and can be used to prepare the terpolymer compositions of this invention.

While the exact mechanism of the polymerization reaction of this invention is not clearly understood, it is believed that the reaction is of the free radical type initiated by a peroxide formed by the reaction of organoboron with trace quantities of oxygen. The organoboron is also believed to complex with the free radical at the end of the polymer chain in such a way that termination of the reaction becomes less likely, resulting in the formation of polymers having molecular weights higher than would be produced in the absence of the organoboron compound. Further, the organoboron catalyzed reaction may result in a polymer having a different composition or a different distribution of substituent groups along the polymer chain than would be obtained by other methods of polymerization. Thus, while I do not desire to be held to any particular theory of operation, it has nevertheless been demonstrated that polymer compositions prepared by the method of this invention are superior in many important properties to those prepared by the heretofore known techniques.

Although the presence of trace quantities of oxygen are believed necessary to initiate the free radical polymerization reaction, the presence of excess oxygen terminates the polymerization reaction prematurely, thus resulting in a lower molecular weight polymer product. While, in a preferred embodiment of this invention, it is desirable that excess oxygen be removed prior to initiating the reaction, polymerization with organoborons may be successful even though a relatively large quantity of oxygen is initially present in the reaction mixture since most of the oxygen is consumed by reaction with the organoboron to produce more highly oxidized boron compounds which are not effective in providing free radicals. Thus, it is within the scope of this invention to control the amount of oxygen in contact with the reactant solution during the polymerization reaction. Oxygen can be controlled to suitable levels by evacuating and purging the reaction vessel of air prior to initiating the polymerization reaction to remove the excess undissolved oxygen from the system, the optimum content of oxygen dissolved in the reactant solution being a molar concentration about equal to the molar concentration of the organoboron compound present. Thus, it is preferred in most applications that the reactant monomer solution contain between about 15 and about 600 p.p.m. of dissolved oxygen based on the monomer content of the solution. Excess dissolved oxygen can be removed from the reactant solution, if desired. Conversely, in those cases where the reaction mixture is totally devoid of the necessary quantity of oxygen to initiate the free radical reaction, it is within the scope of this invention to add oxygen to the reaction mixture.

The polymerization of the acrylic monomers usually can be initiated at room temperature although some mild heating may be necessary in certain polymerization reactions. These reactions are exothermic and are accompanied by a release of heat causing an increase in reactant temperature. While normal temperature increases can be accommodated with no particular problem, too high of a rate for the exothermic polymerization reaction would cause a significant increase in temperature, especially after the solution has thickened so that heat dissipation is impaired. With increased temperature, further increased in polymerization rate result. This tendency toward "run away" polymerization is greater with a higher concentration of monomers in solution. Higher temperatures can also cause cross-linking of the polymer resulting in polymers of reduced water solubilities and other inferior properties. With most reactant systems it is preferred that the reaction temperature be controlled below about 65° C. Accordingly, it is within the scope of this invention to control the concentration of monomers below the level resulting in excessive temperature increases resulting in "run away" polymerization, and more particularly at temperatures below about 65° C. In most applications, excessive temperatures are not encountered at reactant concentrations below about 30 weight percent monomer mixture. Further, it is within the scope of the invention to cool the reaction mixture sufficiently to prevent excessive temperatures. Although the minimum amount of the organoboron catalyst required to initiate the reaction will depend somewhat on the oxygen content of the system, as hereinbefore disclosed, it has nevertheless been found that polymerization of most systems can be initiated at catalyst concentrations of 5–200 p.p.m. of boron based on the weight of monomers present. Since the molecular weights of the various catalysts are different, catalyst additions are conveniently based on boron content, it being understood that differeint amounts of the various organoboron compounds must be employed to provide equivalent quantities of boron.

Thus, the viscous flooding agents of this invention are produced by dissolving the acrylic monomer, or mixture of monomers, in water and initiating polymerization by introducing a small amount of organboron catalyst into the reactant solution. The resulting product is a viscous aquous solution or gel of the polymeric product, the consistency depending upon the initial concentration of monomers and the degree of polymerization. This product is neutralized by the addition of a suitable alkaline material, such as ammonium or alkali metal hydroxide, to form salts of the polymer and the viscous solution diluted to obtain a relatively dilute aqueous polymer solution exhibiting the properties desired for a particular flooding operation. Neutralization is facilitated by adding at least a part of the diluent liquid with or prior to the addition of the alkaline agent. Alternatively, the viscous or gelatinous polymer product can be neutralized and dehydrated to obtain a solid polymer that can be stored and transported to a field location as desired. In this latter mode of operation, the flooding medium is prepared by dissolving the solid polymer in water or brine in conventional manner.

According to one specific mode of practicing the invention, an aqueous solution containing up to about 50 weight percent of reactant monomers, and more preferably from about 10 to about 30 weight percent of monomers, is charged to a closed reaction vessel. Air is removed from the vessel by purging with a substantially oxygen-free inert gas, such as nitrogen or helium, or by successively evacuating the air space above the liquid and purging with inert gas. A substantially oxygen-free atmosphere is maintained during the reaction to prevent additional quantities of oxygen from being absorbed into the solution. Also, the reactant solution can be stripped of a substantial portion of the dissolved oxygen by passing an oxygen-free inert gas through the liquid. The polymerization reaction is initiated by the injection of the organoboron catalyst, preferably in an amount equivalent to at least 5–200 parts of boron per million parts of monomers. The reactant solution is preferably agitated sufficiently to mix the catalyst into the solution and then agitation is discontinued during the bulk of the reaction period. Agitation can variously be effected by shaking the reaction vessel, by mechanical mixing, or by bubbling a stream of inert gas through the reactant liquid. As hereinabove disclosed, temperatures are desirably controlled below 65° C. during the reaction. The polymerization reaction is complete within a period of several days, and often within a period of a few hours.

Upon completion of the polymerization reaction, or after the polymerization has progressed to the extent that a desirable polymer is obtained, the resulting viscous polymer solution or gel is neutralized by the addition of an alkaline material, and particularly a monovalent alkaline material, such as an alkali metal hydroxide, and in particular sodium or potassium hydroxide, or ammonium hydroxide and the like. Sufficient alkaline material can be added in this step to adjust the pH of the resultant solution to a value of 8–9, or only a portion of the alkaline material can be added at this point and the final pH adjustment made after dilution. Alternatively, some or all of the aqueous diluent can be added with or prior to the addition if the alkaline material. In any event, the resulting neutralized polymer solution is diluted with water or brine to obtain a viscous aqueous flooding material having the degree of mobility desired for a particular flooding application. These desired flooding solutions usually contain between about 0.002 to about 0.5 weight percent polymer, although solutions containing more or less polymer can be employed where desired. Further, additional agents, such as bacteriocides and corrosion inhibitors, can be incorporated into the flooding solution, if desired.

The organoboron catalysts useful in the practice of this invention are for the most part oleaginous materials having limited solubility in water. This property of the catalyst limits its effectiveness as undissolved droplets of the organoboron compound accumulate in the aqueous reactant solution and do not readily contribute to the polymerization. More efficient dispersion of the catalyst can be achieved by first dissolving the catalyst in a mutual solvent which is miscible with water, at least in the range of concentrations encountered. Suitable solvents for the organoboron catalysts, and in particular for the preferred trialkylboron catalysts, which are also miscible with water include dioxane, dimethylsulfoxide, and low molecular weight alcohols and ketones. The catalyst is dissolved in a convenient volume of solvent and this solution added to the reactant monomer solution to initiate the polymerization reaction. Although the concentration of the catalyst in the solution is not critical, this solution can conveniently contain from about 5 to about 50 parts of an organoboron compound, such as trialkylboron, per part of solvent.

Also, certain of the trialkylborons are sufficiently volatile that they can be added to the reactant monomer solution is vapor form. Thus, particularly in the case of those trialkylborons containing primarily methyl and ethyl substituent groups, the catalyst can be vaporized and contacted with the monomer solution by bubbling the catalyst vapor into the reactant solution. Alternatively, catalyst vapor can be admixed with an inert carrier gas, such as helium or nitrogen, and bubbled into the monomer solution. With this mode of catalyst addition it may be advantageous to recycle the inert gas to avoid the loss of catalyst in the gas exiting the solution.

Another embodiment of the present invention involves a water flooding process employing a dilute aqueous solution of acrylic acid-acrylamide-diacetone acrylamide terpolymer which is prepared by copolymerization of the monomers at the well site. This embodiment of the invention can be more readily understood by reference to the drawing wherein a permeable oil-bearing strata 10, overlain by overburden 12, is penetrated by injection well 14 and output well 16, the wells 14 and 16 being spaced apart in strata 10. In accordance with the practice of this invention, a flooding medium is injected through the well 14 and into oil-bearing strata 10, whereupon it is forced through the strata displacing oil and other fluids towards well 16. The produced fluids are recovered through the conduit 18 in conventional manner.

The polymer thickening agent is prepared in vessel 30 which is provided with mixer 32. The vessel is also provided with a conduit 34 having valve 36 therein connecting the vessel with a vacuum source, and the conduit 38 and valve 40 connecting the vessel with a source of substantially oxygen-free purge gas. The acrylic acid-acrylamide-diacetone acrylamide terpolymer is prepared by charging acrylic acid, acrylamide, diacetone acrylamide and water to the vessel 30 in the hereinbefore disclosed proportions. These ingredients are mixed to dissolve the monomers and to obtain a substantially homogeneous reaction mixture. Next the vessel is closed and a vacuum pulled through the conduit 34 and valve 36 to remove air from vessel 30. The substantially oxygen-free inert gas is then purged into the vessel to maintain an oxygen-free atmosphere in the vessel during the polymerization step. If desired, the vacuum and purging steps can be repeated to remove substantially all of the undissolved oxygen from the system.

Polymerization is initiated by introducing a small amount of an organoboron catalyst, such as a trialkylboron compound, preferably as a solution in a water-miscible solvent, such as dioxane. The reactant solution is briefly agitated to mix the catalyst, and the resulting polymerization allowed to proceed to completion. The viscous or gelatinous polymerization product is then diluted with an aqueous liquid, such as water or brine, and the pH adjusted to an alkaline value, and preferably to a pH value of 8–9. The resulting alkaline polymer solution is then withdrawn from the vessel through conduit 42 at a rate controlled by valve 44 and admixed with water or brine flowing to well 16 through conduit 20 and valve 22. The specific disclosure of pumps, instruments, and miscellaneous auxiliary equipment has been deleted to facilitate the understanding of the invention.

The invention can be illustrated further by the following examples which are illustrative of specific modes of practicing the invention and are not intended as limiting the scope of the invention as defined by the appended claims.

EXAMPLE 1

A reactant solution is prepared by dissolving 4.05 parts by weight of acrylic acid, 9.45 parts by weight of acrylamide and 1.5 parts by weight of diacetone acrylamide in 85 parts by weight water. The reactant solution is placed in a closed vessel and the vessel is evacuated and purged with helium. A helium blanket is maintained in the vessel during the reaction. Copolymerization of the reactants is initiated by the addition of a solution of triethylboron in dioxane. Upon completion of the reaction, the gelatinous product is diluted with 3 percent by weight sodium chloride solution and neutralized to pH 9 with sodium hydroxide. This polymer concentrate is used to prepare a series of dilute polymer solutions in 3 percent brine having different concentrations of terpolymer.

The Brookfield viscosity and resistance factor of the test solutions are determined by conventional techniques. These results are compared with the viscosity and resistance factor of 3 percent brine solutions of a partially hydrolyzed polyacrylamide marketed by the Dow Chemical Company under the trademark Pusher 500. The results of these tests are reported in Table 1.

TABLE 1.—COMPARISON OF ACRYLIC ACID-ACRYLAMIDE-DIACETONE ACRYLAMIDE TERPOLYMER AND PARTIALLY HYDROLYZED POLYACRYLAMIDE

| Polymer Type | Polymer concentration, p.p.m. | Brookfield viscosity cp. at 30 r.p.m. | Resistance factor |
|---|---|---|---|
| Pusher 500 [1] | 500 | 1.6 | 6.5 |
|  | 250 | 1.4 | 4.3 |
|  | 125 | 1.3 | 3.0 |
|  | 62.5 |  | 2.1 |
| AADA [2] | 500 | 6.4 | 30.6 |
|  | 250 | 3.2 | 24.6 |
|  | 125 | 1.8 | 18.7 |
|  | 62.5 | 1.4 | 14.3 |
|  | 15.3 |  | 6.0 |

[1] Partially hydrolyzed polyacrylamide marketed by the Dow Chemical Company under the trademark Pusher 500.
[2] Acrylic acid-acrylamide-diacetone acrylamide terpolymer.

EXAMPLES 2–9

A number of polymerizations are conducted with different monomer compositions and with varied reaction conditions. The monomer composition is varied from about 10–50 weight percent acrylic acid, 25–85 weight percent acrylamide, and 1–25 weight percent diacetone acrylamide. The concentration of monomers in the reactant solution is varied from about 10–30 weight percent. The amount of oxygen present in the reaction solution is controlled at varying levels by employing different methods of oxygen control. Catalysts types, concentrations and addition methods are varied. The monomer composition, reaction conditions, and the nature of the product are set forth in Table 2 for each of the runs.

amount of oil recovered is measured. Oil recoveries after 2.4 pore volumes of flooding medium has been passed through the core are reported in Table 3.

TABLE 3.—COMPARATIVE OIL RECOVERIES

| Flooding Medium | Polymer concentration, p.p.m. | Oil recovery after 2.4 pore volumes of flood water, vol. percent |
|---|---|---|
| Brine | 0 | 54 |
| Pusher 500 Solution [1] | 500 | 72.9 |
| AADA Solution [2] | 125 | 71.0 |
| Do [2] | 250 | 82.5 |

[1] 3% brine solution of partially hydrolyzed polyacrylamide marketed by the Dow Chemical Company under the trademark Pusher 500.
[2] 3% brine solution of acrylic acid-acrylamide-diacetone acrylamide terpolymer.

These data demonstrated the marked superiority of acrylic acid-acrylamide-diacetone acrylamide terpolymer as an additive for flood water. It is apparent from the foregoing that oil recovery is about 10 percent higher with a flooding medium containing acrylic acid-acrylamide-diacetone acrylamide terpolymer than with Pusher 500, even though the terpolymer is employed at only ½ of the polymer concentration of the Pusher 500 solution. Similar oil recoveries can be obtained with terpolymer solutions containing only about ¼ of the polymer addition that is required with the Pusher 500.

EXAMPLE 11

An oil-bearing subterranean strata is flooded with a viscous flooding medium in accordance with the method of this invention. The flooding medium is a dilute aqueous solution of acrylic acid-acrylamide-diacetone acrylamide copolymer prepared by copolymerization of the monomers at the well site. A monomer mixture of 27 parts by weight of acrylic acid, 63 parts by weight acrylamide, and 10 parts by weight diacetone acrylamide is charged to a reaction vessel and dissolved in water to make a reactant solution of 20 percent monomers. The vessel is closed and evacuated to remove air from the space above the reactant

TABLE 2

| Example Numbers | Monomer composition, wt. percent | | | Monomer concentration, wt. percent | Method of oxygen control [2] | Catalyst type [3] | Catalyst carrier | Catalyst concentration, p.p.m.[5] | Product |
|---|---|---|---|---|---|---|---|---|---|
|  | Acrylic acid | Acrylamide | DAA [1] | | | | | | |
| 2 | 10 | 85 | 5 | 10 | C | TEB | None | 20 | Gel. |
| 3 | 25 | 65 | 10 | 15 | B | TBB | Dioxane | 40 | Gel. |
| 4 | 50 | 25 | 25 | 20 | C | TPB | DMSO [4] | 80 | Gel. |
| 5 | 15 | 75 | 10 | 25 | C | TMB | Helium gas | 10 | Gel. |
| 6 | 40 | 45 | 15 | 30 | C | TBB | None | 5 | Gel. |
| 7 | 27 | 63 | 10 | 15 | A | TEB | Dioxane | 40 | No polymer. |
| 8 | 27 | 63 | 10 | 15 | A | TEB | ___do___ | 80 | Viscous liquid. |
| 9 | 27 | 63 | 10 | 15 | A | TEB | ___do___ | 200 | Gel. |

[1] Diacetone acrylamide.
[2] A=No oxygen control; B=helium bubbled through solution; C=evacuation and helium blanketing.
[3] TMB=Trimethylboron; TEB=Triethylboron; TPB=Tripropylboron; TBB=Tri(n-butyl)boron.
[4] DMSO=Dimethyl sulfoxide.
[5] Catalyst concentration expressed as parts of boron per million parts of monomer.

EXAMPLE 10

A water flooding operation is simulated in a sand pack model of ¼ of a five-spot well pattern to determine the effectiveness of dilute aqueous solutions of acrylic acid-acrylamide-diacetone acrylamide terpolymer as a flooding medium for oil recovery. The oil saturated sand pack is flooded in a series of tests with aqueous 3 percent brine solution containing no polymer, with aqueous 3 percent brine solutions of the acrylic acid-acrylamide-diacetone acrylamide terpolymer prepared in Example 1 containing respectively 125 and 250 p.p.m. terpolymer, and with an aqueous 3 percent brine solution containing 500 p.p.m. partially hydrolyzed polyacrylamide marketed by the Dow Chemical Company under the trademark Pusher 500. In each of the tests, flooding solution is injected into the peripheral well and displaced through the oil-saturated sand pack towards the center output well. Oil and other fluids are recovered from the center output well and the solution, and the vacuum is broken with helium gas. The evacuation and purging steps are repeated three times to remove substantially all of the undissolved air from the vessel. A helium atmosphere is maintained during the reaction.

The polymerization reaction is initiated by adding triethylboron dissolved in dioxane to the reactant solution in an amount equivalent to 200 parts of boron per million parts of monomer and briefly agitating the reaction liquid to assure mixing of the catalyst. After about 24 hours the polymerization reaction is complete and the gelatinous product is diluted with water and neutralized to a pH of about 8 with sodium hydroxide.

The resulting polymer concentrate is then metered into an aqueous brine solution to provide therein a polymer concentration of about 0.05 weight percent. The polymer solution is injected into the oil-bearing formation through four injection wells arranged in a "five spot" pattern around a central production well. Oil and other fluids are produced from the production well in conventional manner.

EXAMPLE 12

A flooding operation is practiced in accordance with Example 11 wherein the polymer solution is injected into the formation in the amount of 0.05 pore volume and is followed by the injection of brine to displace the polymer solution towards the production well.

Various embodiments and modifications of this invention have been described in the foregoing description and examples, and further modifications will be apparent to those skilled in the art. Such modifications are included within the scope of this invention as defined by the following claims.

Having now described the invention, I claim:

1. In the process for recovering petroleum from a subterranean oil-bearing formation in which a viscous flooding medium comprising an aqueous solution of a water-soluble organic polymer is injected through an input well penetrating said formation and forced through said formation towards at least one spaced output well and petroleum is recovered from said output well, the improvement which comprises employing as said flooding medium an aqueous solution of acrylic acid-acrylamide-diacetone acrylamide terpolymer.

2. The process defined in claim 1 wherein said aqueous solution contains about 0.002 to 0.5 weight percent of said terpolymer.

3. The process defined in claim 1 wherein about 0.005 to 0.5 pore volumes of said aqueous solution are injected into said input well and forced through said formation by the subsequent injection of a driving fluid.

4. In the process for recovering petroleum from a subterranean oil-bearing formation in which a viscous flooding medium comprising an aqueous solution of a water-soluble organic polymer is injected through an input well penetrating said formation and forced through said formation towards at least one spaced output well and petroleum is recovered from said output well, the improvement which comprises employing as said flooding medium an aqueous solution of an acrylic acid-acrylamide-diacetone acrylamide terpolymer having the following generalized formula

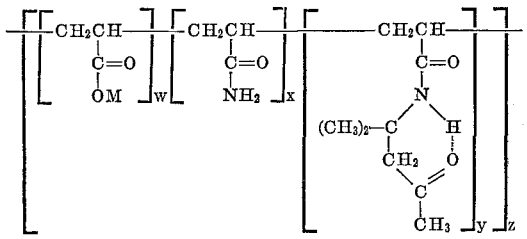

wherein M is a monovalent cation; $w$ is from about 15–35, $x$ is from about 45–80, $y$ is from about 2–15, and the sum of $w$, $x$ and $y$ totals 100; and $z$ varies up to about 8000.

5. The process defined in claim 4 wherein the terpolymer is further characterized by a viscosity of at least 3 centipoises for a 0.05 percent by weight solution thereof in an aqueous 3 percent by weight sodium chloride solution at a temperature of 65° C. as determined by a Brookfield viscosimeter equipped with a U.L. adapter spindle and operated at a speed of 30 r.p.m.

6. The process defined in claim 4 wherein the terpolymer is further characterized by a resistance factor above about 15 for a 0.05 percent by weight solution of the polymer in a 3 percent by weight solution of sodium chloride at 25° C.

7. A process for recovering petroleum from a subterranean oil-bearing formation penetrated by an input well and at least one spaced output well, which comprises:
preparing an aqueous solution of acrylic acid, acrylamide and diacetone acrylamide monomers;
adding to said solution a quantity of an organoboron compound sufficient to effect the copolymerization of said monomers whereby a polymeric product is formed;
neutralizing said polymeric product;
diluting said polymeric product with aqueous liquid to obtain a dilute aqueous solution of said polymer;
injecting said dilute polymer solution into said formation through said input well and forcing said solution through said formation toward said output well; and
recovering oil from said output well.

8. The method defined in claim 7 wherein said aqueous monomer solution contains between about 10–30 weight percent monomers.

9. The method defined in claim 7 wherein said monomers are in the proportion of about 15–35 parts of acrylic acid, 45–80 parts of acrylamide, and 2–15 parts of diacetone acrylamide per 100 parts of monomer mixture.

10. The method defined in claim 7 wherein said copolymerization is conducted in a substantially inert atmosphere.

11. The method defined in claim 7 wherein said organoboron compound is a trialkylboron having the following general formula

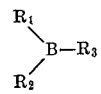

wherein $R_1$, $R_2$ and $R_3$ are alkyl radicals.

12. The method defined in claim 11 wherein said alkyl radicals contain up to about four carbon atoms.

13. The method defined in claim 7 wherein said organoboron compound is added in an amount equivalent to about 5–200 parts of boron per million parts of monomers.

14. The method defined in claim 7 wherein said organoboron is added as a solution in a solvent miscible with water.

15. A process for recovering petroleum from a subterranean oil-bearing formation penetrated by an input well and at least one spaced output well, which comprises:
preparing an aqueous solution of about 10–30 weight percent of a mixture of acrylic monomers dissolved in water, said monomers being in the proportion of about 15–35 parts of acrylic acid, 45–80 parts of acrylamide and 2–15 parts of diacetone acrylamide per 100 parts of monomer mixture;
removing oxygen from contact with said oxygen solution;
adding to said monomer solution, in an amount sufficient to cause the copolymerization of said monomers whereby a polymeric product is formed, a second solution of a trialkylboron compound dissolved in a solvent miscible with water, said trialkylboron compound having the general formula

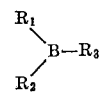

wherein $R_1$, $R_2$ and $R_3$ are alkyl radicals containing up to four carbon atoms;
neutralizing said polymeric product to a pH of about 8–9 with ammonium hydroxide or alkali metal hydroxide;
diluting said polymeric product with aqueous liquid to obtain a dilute aqueous solution of said polymer;
injecting said dilute polymer solution into said formation through said input well and forcing said solution through said formation toward said output well; and recovering oil from said output well.

References Cited
UNITED STATES PATENTS

| | | | |
|---|---|---|---|
| 2,827,964 | 3/1958 | Sandiford et al. | 166—9 |
| 2,985,633 | 5/1961 | Welch | 260—85.3 |
| 3,002,960 | 10/1961 | Kolodny | 260—80.3 X |
| 3,039,529 | 6/1962 | McKennon | 166—42 X |
| 3,070,158 | 12/1962 | Roper et al. | 166—9 |
| 3,277,056 | 10/1966 | Coleman | 260—63 |
| 3,396,790 | 8/1968 | Eaton | 166—9 |
| 3,399,725 | 9/1968 | Pye | 166—9 |

FOREIGN PATENTS 1,206,042  8/1959  France.

OTHER REFERENCES

Ashikari, Journal of Polymer Science, vol. 28, No. 116, (1958), pp. 250–252.

Ashikari et al., Journal of Polymer Science, vol. 31, No. 122 (1959), pp. 249–251.

STEPHEN J. NOVOSAD, Primary Examiner

U.S. Cl. X.R.

166—275